(12) United States Patent
Irwin

(10) Patent No.: US 7,978,682 B2
(45) Date of Patent: Jul. 12, 2011

(54) METHODS, SYSTEMS, AND COMPUTER-READABLE MEDIA FOR OPTIMIZING THE COMMUNICATION OF DATA PACKETS IN A DATA NETWORK

(75) Inventor: Tim Irwin, Marietta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 1006 days.

(21) Appl. No.: 11/124,943

(22) Filed: May 9, 2005

(65) Prior Publication Data

US 2006/0250965 A1 Nov. 9, 2006

(51) Int. Cl.
*H04L 12/28* (2006.01)

(52) U.S. Cl. ...................................................... 370/351

(58) Field of Classification Search .................. 370/235, 370/238, 230, 241, 248, 252, 253, 254, 255, 370/400, 351, 389; 709/224–229, 238–244
See application file for complete search history.

(56) References Cited

U.S. PATENT DOCUMENTS

| | | | |
|---|---|---|---|
| 6,260,072 B1 * | 7/2001 | Rodriguez-Moral | 709/241 |
| 6,978,223 B2 * | 12/2005 | Milliken | 702/182 |
| 7,251,216 B2 * | 7/2007 | Dube et al. | 370/232 |
| 7,292,537 B2 * | 11/2007 | Charcranoon | 370/252 |
| 7,372,819 B2 * | 5/2008 | Martin | 370/252 |
| 2004/0052259 A1 * | 3/2004 | Garcia et al. | 370/392 |
| 2005/0232239 A1 * | 10/2005 | Ilnicki et al. | 370/352 |
| 2005/0281204 A1 * | 12/2005 | Karol et al. | 370/248 |
| 2006/0203805 A1 * | 9/2006 | Karacali-Akyamac et al. | 370/352 |

OTHER PUBLICATIONS

A one way delay metric for IPPM, Almes, RFC 2679, Internet Society, Sep. 1999, pp. 1-20.*

* cited by examiner

*Primary Examiner* — Dmitry H Levitan
(74) *Attorney, Agent, or Firm* — Larson Newman, LLP

(57) ABSTRACT

Methods, systems, and computer-readable media are provided for optimizing the communication of data packets in a data network. Network devices, such as routers, in the data network may be optimized to automatically calculate current latency values for a network path in real-time or near real-time and intelligently forward data packets based on the calculated values. The network devices may further optimally forward prioritized data traffic over network paths selected based on the calculated latency values.

16 Claims, 4 Drawing Sheets

METHODS, SYSTEMS, AND COMPUTER-READABLE MEDIA FOR OPTIMIZING THE COMMUNICATION OF DATA PACKETS IN A DATA NETWORK

TECHNICAL FIELD

The present invention relates generally to the field of data communications, and more particularly, to self-optimizing the communication of data packets in a data network.

BACKGROUND OF THE INVENTION

Many applications and services communicate information over data networks, such as the Internet, in the form of data packets. In a typical data network, network devices (e.g., routers) process and forward the data packets to neighboring network devices utilizing one or more adjacent network paths or links according to addressing information contained therein. Network devices in a data network use routing protocols to send and receive information about directly connected network links to all other network devices in the network. Two commonly used routing protocols are Open Shortest Path First ("OSPF") and Intermediate System-to-Intermediate System ("IS-IS"). Network devices use the information communicated via the routing protocols to build one or more routing tables which give a common topological view of the data network. Thus, each network device has the same "view" of the network as every other network device. Once this common view of the network is built, the routing protocols build a Shortest Path First tree (or "SPF" tree) in order to determine the "best" path from one network device to another device.

A single service provider may utilize a data network to communicate data, voice, and video contained in data packets, to its customers. In providing these multiple services to customers, service providers are often faced with the challenge of integrating different types of services based on disparate technologies into a single data network. For example, service providers of internet protocol ("IP") based voice and data applications must engineer IP-based data networks to comply with specific quality of service ("QoS") requirements associated with each service. For example, Voice over IP ("VoIP") telephony requires a minimum amount of end-to-end latency (i.e., delay) and jitter while IP-based video demands low latency and minimal packet loss.

Thus, one of the foremost challenges faced by service providers is in keeping network delay to a minimum so as to assure minimum QoS requirements. Currently, service providers attempt to minimize delay by configuring network devices to send data packets over the network paths having the highest bandwidth (i.e., the network path capable of transmitting the greatest amount of data in a fixed amount of time). Generally, this is accomplished by configuring the routing protocols (e.g., OSPF or IS-IS) in network devices to calculate a "cost" metric based on the inverse of the current bandwidth of connected network paths. Thus, when building the SPF tree in order to determine the "best" path from one network device to another device, the routing protocols will select the path calculated as having the lowest cost (i.e., the highest bandwidth). As a result, the network devices within the network will route data packets over the network path having the lowest cost. Unfortunately, current methods for minimizing network delay suffer from a number of drawbacks.

One drawback associated with current methods for minimizing network delay is that the lowest cost path is not always the "best" path for applications having specific QoS requirements. For example, the "best" path for VoIP voice traffic largely depends on the shortest end-to-end latency which is not measured by current routing protocols. Another drawback associated with current methods for minimizing network delay is that engineering the network to adapt to the QoS requirements for applications such as VoIP and IP-based video requires the manual collection of network management data from the network and reliance on out-of-band-post-processing (typically provided by a third-party application) to generate an optimized network topology for the network. Thus, there is no real-time or near real-time integration of current routing protocols.

BRIEF SUMMARY OF THE INVENTION

In accordance with the present invention, the above and other problems are addressed by methods, systems, and computer-readable media for optimizing the communication of data packets in a data network. Network devices (e.g., routers) in the data network may be optimized to calculate current latency values for a network path in real-time or near real-time and intelligently forward data packets based on the calculated values. The network devices may further optimally forward prioritized data traffic over network paths selected based on the calculated latency values.

According to one aspect of the invention, a method is provided for optimizing the communication of data packets in a data network. The method includes automatically determining a current latency value for adjacent network paths in the data network, selecting the adjacent network paths having the lowest current latency value, and communicating the data packets over the selected adjacent network path. The current latency value for an adjacent network path is determined by receiving a message packet over the adjacent network path, determining a first time stamp corresponding to when the message packet was sent over the adjacent network path, determining a second time stamp corresponding to when the message packet was received over the adjacent network path, calculating the difference between the first time stamp and the second time stamp to determine the current latency value for the adjacent network path, and populating a routing table with the current latency value for the selected network path.

In communicating the data packets over the selected adjacent network path having the lowest current latency value, the method includes prioritizing the data packets and forwarding the data packets having the highest priority data over the selected one of the plurality of adjacent network paths. The data packets may be prioritized according to Multiprotocol Label Switching ("MPLS") protocol and may include VoIP data. The method further includes communicating the current latency values over adjacent network paths.

Other embodiments of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent

DETAILED DESCRIPTION OF THE INVENTION

Figure 1:
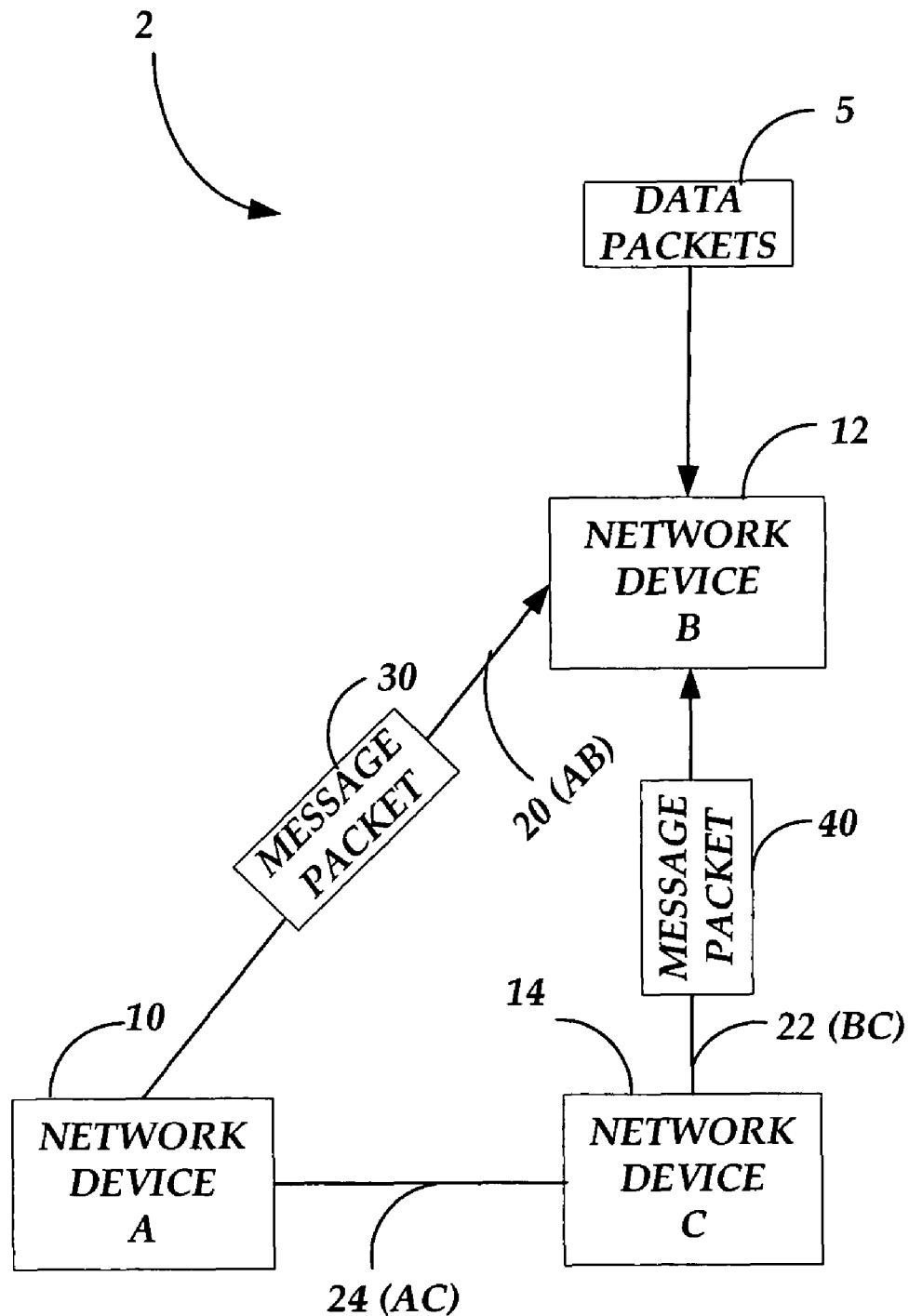
FIG. 1 is a diagraph of a data network which may be utilized according to the various illustrative embodiments of the invention.

Illustrative embodiments of the present invention provide for methods, systems, and computer-readable media are for optimizing the communication of data packets in a data network. Network devices, such as routers, in the data network may be optimized to automatically calculate current latency values for a network path and intelligently forward data packets based on the calculated values. The network devices may further optimally forward prioritized data traffic over network paths selected based on the calculated latency values. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a data network 2 which is represented by a diagraph as shown in FIG. 1. It will be appreciated that in one illustrative embodiment, the data network 2 is an Internet Protocol/Multiprotocol Label Switched ("IP/MPLS") based network for communicating data, voice, and video for a variety of applications, including, but not limited to, VoIP, IP-based video, and Internet web page data. As is known to those skilled in the art, the MPLS standard enables IP-based network service providers to improve IP packet exchange by prioritizing the communication of IP data packets in a data network based on the type of data. For example, VoIP data packets require a minimum amount of end-to-end latency (i.e., delay) and jitter and thus may be assigned a higher priority than other Internet data traffic in an IP/MPLS network. In particular, for VoIP, International Telecommunication Union (ITU) G.107 and G.114 specifications (incorporated by reference herein) state that a certain amount of one-way delay for transmission time, including delay due to equipment processing time as well as propagation delay, does not cause perceptible loss of voice quality in most cases. In order to maintain high call quality, it is recommended to keep the total mouth-to-ear latency to less than 150 milliseconds (ms) of one-way delay.

It will be appreciated by those skilled in the art that the data network 2 is not limited to an IP-based network but may also include frame relay networks, asynchronous transfer mode ("ATM") networks, or any other network capable of communicating data conforming to Layers 2-4 of the Open Systems Interconnection ("OSI") model developed by the International Standards Organization, incorporated herein by reference. It will further be appreciated that the MPLS standard may also be utilized with any of the aforementioned networks.

The data network 2 includes network device A 10, network device B 12, and network device C 14. It will be appreciated that in the various embodiments of the invention, the aforementioned network devices 10, 12, and 14 are routers for receiving and forwarding data packets. It should be understood that in the foregoing description, the terms "network device" and "router" may be used interchangeably without any deviation in meaning. As is known to those skilled in the art, routers use headers and forwarding tables to determine the best path for forwarding the packets, and they use protocols to communicate with each other and configure the best route between any two hosts in a data network. Logic contained in the network devices is responsible for processing and forwarding received protocol data packets. This logic includes a "control plane" for queuing and scheduling data packets before they are forwarded.

It will be appreciated that the routing protocols utilized by the routers 10, 12, and 14 may be link-state routing protocols. As is known to those skilled in the art, link-state routing protocols are based on algorithms (known as "Dijkstra" algorithms) which are characterized by the fact that each router in a domain floods information about its directly connected networks to all routers in the domain, from which each and every router is capable of constructing the same topological view of the entire network. Once a common view of the network is built, the routing algorithm builds an SPF (i.e., Shortest Path First) tree to determine a list or table of values each of which are inversely proportional to the speed (i.e., bandwidth) for adjoining links or network paths. Each of the values corresponding to the inverse of the speed of a given link or network path is called a "cost" value. The link having the lowest "cost" value may be used to determine a preferred network path for routing data between two routers for some applications. The link-state routing protocols utilized in the illustrative embodiments of the invention may include the commonly used Open Shortest Path First ("OSPF") and Intermediate System-to-Intermediate System ("IS-IS") protocols. The router B 12 will be described in greater detail with respect to FIG. 2, below.

In the data network 2, the routers 10, 12, and 14 are connected by network paths (or links) 20, 22, and 24 which represent interconnecting networks. It will be appreciated that the network paths 20, 22, and 24 are network circuits for routing data among the routers 10, 12, and 14 at a given port speed (e.g., OC-3 or 156 Mbps). It should be understood that the network path 20 represents the path between the router A 10 and the router B 12 (i.e., path "AB"), the network path 22 represents the path between the router B 12 and the router C 14 (i.e., path "BC"), and the network path 24 represents the path between the router A 10 and the router C 14 (i.e., path "AC"). The data network 2 also includes the communication of message packet 30 over the network path 20 and the communication of message packet 40 over the network path 22. In the various illustrative embodiments of the invention, the message packets 30 and 40 may be utilized to communicate informational messages about the router from which it is sent such as router status (i.e., whether or not the router is communicating data). The message packets 30 and 40 may also include a time stamp indicating when they were sent from a router. It will be appreciated that the message packets 30 and 40 may conform to "Hello" packets formatted according to either the OSPF or IS-IS protocols. "Hello" packets are well known to those skilled in the art. The data network 2 also includes data packets 5 which are received and communicated from the router B 12.

Figure 2:
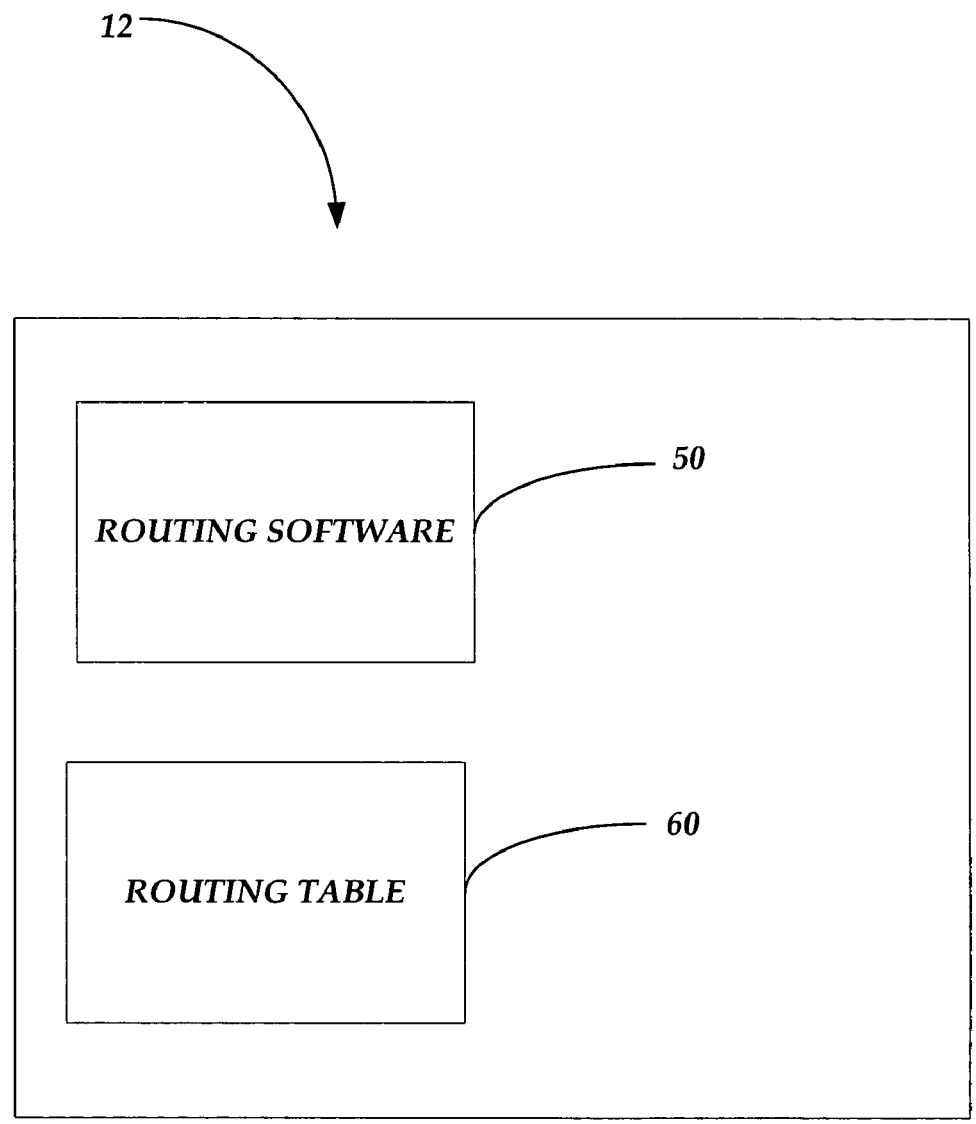
FIG. 2 is a block diagram of a network device in the data network of FIG. 1, according to an illustrative embodiment of the invention.

Referring now to FIG. 2, a block diagram of the router B 12 will now be described. The router B 12 includes routing software 50 and routing table 60. The routing software 50 includes program code for instructing the router B 12 to forward data packets based on a modified version of a common routing algorithm (e.g., OSPF or IS-IS). It should be understood that in the various illustrative embodiments of the invention, the OSPF (or alternatively IS-IS) routing algorithm is modified to determine latency values representing one-way travel times for data packets along network paths in the data network 2. The routing software 50 may also include MPLS program code for prioritizing data packets for various applications (such as VoIP) based on QoS requirements or other predefined criteria. The routing table 60 is created by the routing software 50 using time stamp information contained in message packets received by the router B 12 to determine current latency values of interconnecting network paths (i.e., the network paths 20 and 22 of FIG. 1). The routing table 60 will be described in greater detail with respect to FIG. 3, below.

Figure 3:
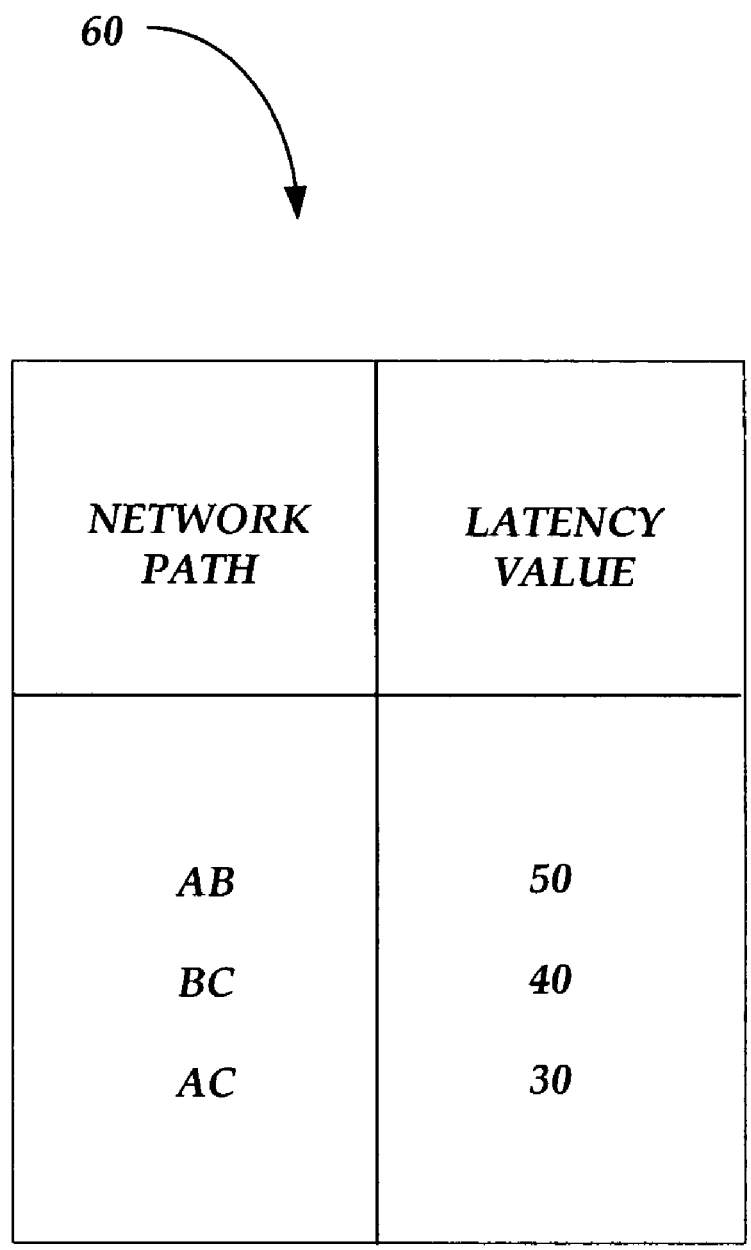
FIG. 3 is a routing table utilized by the network device of FIG. 2 for forwarding data packets, according to an illustrative embodiment of the invention.

Referring now to FIG. 3, the routing table 60 shows current latency values resulting from calculations by the routing software 50 for the network paths 20 (AB), 22 (BC), and 24 (AC) in the data network 2 according to an illustrative embodiment of the invention. As will be described in detail below, the network path having the lowest latency may be selected by the routing software 50 for forwarding prioritized data packets in the data network 2. Logical operations for determining the latency values contained in the table 60 will be described with respect to FIG. 4, below.

Figure 4:
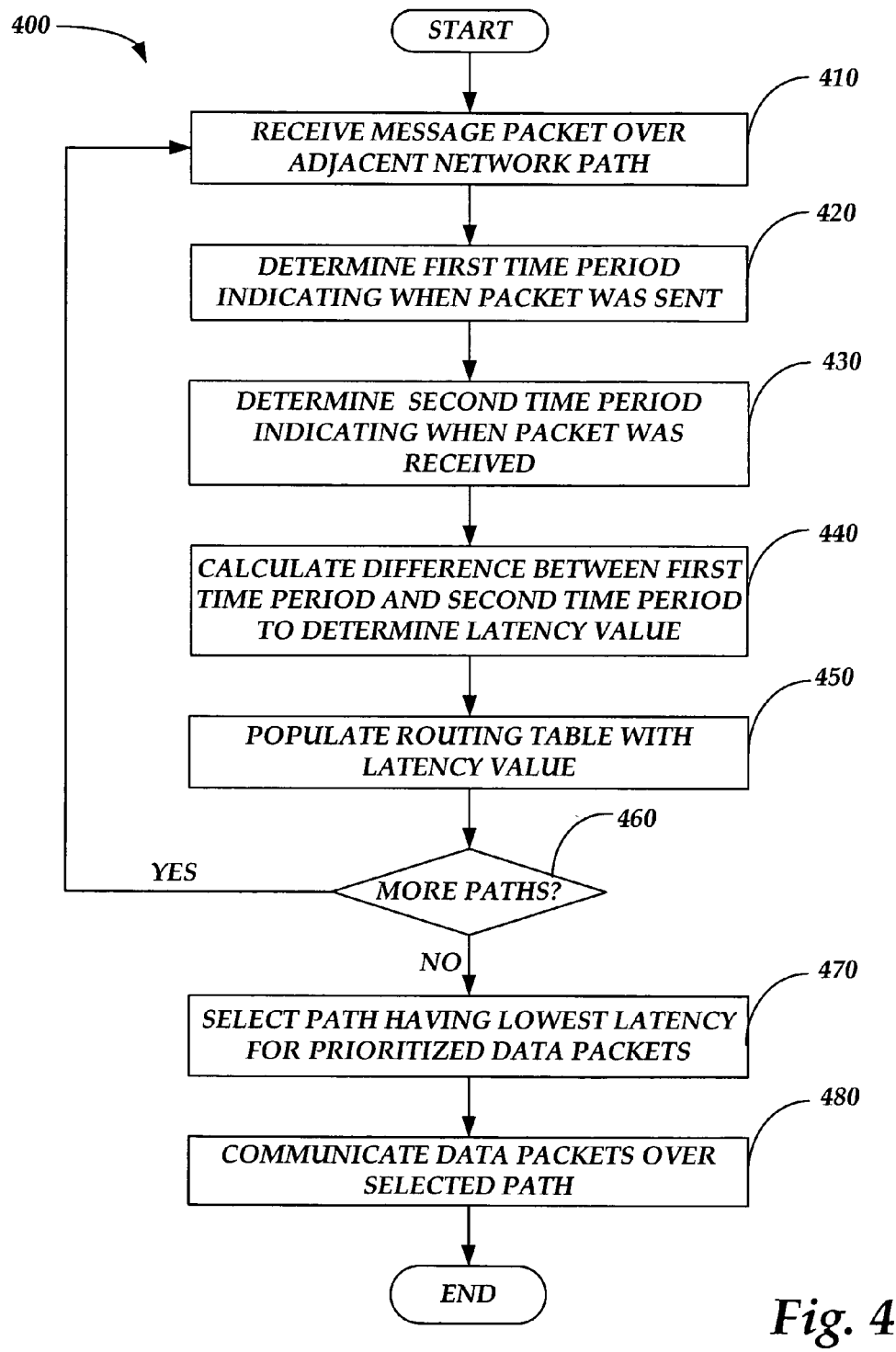
FIG. 4 is a flowchart describing logical operations for optimizing the communication of data packets in the data network of FIG. 1, according to an illustrative embodiment of the invention.

Referring now to FIG. 4, an illustrative routine 400 will be described illustrating a process performed by routing software 50 for optimizing the communication of data packets in a data network by automatically calculating current latency values by selecting network paths for forwarding data packets. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing embodiments of the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 410, wherein a router in the data network 2 receives a message packet (e.g., a "Hello") packet over an adjacent network path. For instance, the router B 12 may receive the message packet 30 from the router A 10 over the network path 20. The routine 400 continues from operation 410 at operation 420 where the routing software 50 determines a first time period indicating when the received message packet was sent over the adjacent network path. In particular, the routing software 50 looks at the data contained in the message packet for a time stamp indicating when the message packet was sent from the sending router. The routine 400 then continues from operation 420 to operation 430.

At operation 430, the routing software 50 determines a second time period indicating when the received message packet was received over the adjacent network path. In particular, the routing software 50 looks at the data contained in the message packet for a time stamp indicating when the message packet was received in the receiving router. The routine 400 then continues from operation 430 to operation 440 where the routing software 50 calculates the difference between the first time period and the second time period to determine a latency value for the adjacent network path. In particular, the routing software 50 calculates the difference in time stamps for the received message packet. For instance, if the difference in time stamps is 50 ms for a message packet sent and received over the network path 20, then this value represents the current latency value.

Once a current latency value is calculated at operation 440, the routine 400 continues at operation 450 where the routing software 50 populates a routing table with the calculated value. The routine 400 then continues at operation 460 where the routing software 50 determines if there are additional adjoining network paths interconnecting with the router. If there are additional adjoining network paths, the routine 400 returns to operation 410 wherein the operations 410-450 are repeated for each adjoining network path.

Once latency values for all of the network paths adjoining a router have been calculated, the routine 400 continues at operation 470 where the routing software 50 accesses the routing table 60 and selects the network path having the lowest latency value for forwarding or communicating data packets. In particular, the operation 470 is accomplished through a modification of the best path selection, or SPF algorithm (specifically the Dijkstra algorithm in the case of OSPF and IS-IS) so that it computes the best path for forwarding data packets based on the current latency values in addition to the "cost" values which are already being computed by the default algorithm. It will be appreciated that the forwarded data packets may be prioritized data packets based on the MPLS standard. Thus, in one illustrative embodiment of the invention, priority data packets may be forwarded based on a latency calculation (such as VoIP or IP-based video data packets) while other data packets may be forwarded using the conventional link "cost" calculation. It will be appreciated that the latency calculation may be utilized for applications with low latency and other QoS requirements, such as VoIP and IP-based video. The routine 400 continues from operation 470 to operation 480 where the routing software 50 initiates the communication of data packets over the selected network path. The routine 400 then ends.

It will be appreciated that the illustrative embodiments of the invention described above provide for methods, systems, and computer-readable media are for optimizing the communication of data packets in a data network. Network devices, such as routers, in the data network may be optimized to automatically calculate current latency values for a network path and intelligently forward data packets based on the calculated values. The network devices may further optimally forward prioritized data traffic over network paths selected based on the calculated latency values. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method for optimizing communication of data packets in a data network, comprising:
   receiving, in a network device, a first message packet over a first network path in a plurality of network paths in the data network;
   receiving, in the network device, a second message packet over a second network path in the plurality of network paths in the data network;
   automatically determining, in the network device, a first latency value for the first network path in the data network based on information in the first message packet;
   automatically determining, in the network device, a second latency value for the second network path in the data network based on information in the second message packet;
   selecting, in the network device, a first particular network path from between the first and second network paths based on the first particular network path having a lowest latency value of the first latency value and the second latency value;
   communicating, from the network device, first data packets having a first priority level over the first particular network path in response to selecting the first particular network path;
   selecting, in the network device, a second particular network path from between the first and second network paths based on the second particular network path having a lowest cost between costs associated with the first and second network paths; and
   communicating, from the network device, second data packets having a second priority level over the second particular network path in response to selecting the second particular network path, wherein the second priority level is lower than the first priority level.

2. The method of claim 1, wherein automatically determining the latency value comprises:
   determining a first time period corresponding to when the first message packet was sent over the first network path;
   determining a second time period corresponding to when the first message packet was received over the first network path;
   calculating the difference between the first time period and the second time period to determine the first latency value for the first network path; and
   populating a routing table with the first latency value for the first network path.

3. The method of claim 2, wherein determining a first time period comprises retrieving a time stamp from the first message packet indicating when the first message packet was sent over the first network path.

4. The method of claim 2, wherein determining a second time period comprises retrieving a time stamp from the first message packet indicating when the first message packet was received over the first network path.

5. The method of claim 2 further comprising communicating the first latency value over each of the plurality of network paths.

6. The method of claim 1, wherein the first data packets comprise data packets containing voice over internet protocol data.

7. A system for optimizing communication of data packets in a data network, the data network comprising at least one network device for communicating the data packets over a plurality of network paths, wherein the at least one network device contains program code for determining latency among at least one of the plurality of network paths, comprising:
   means for receiving, in a network device, a first message packet over a first network path in a plurality of network paths in the data network;
   means for receiving, in the network device, a second message packet over a second network path in the plurality of network paths in the data network;
   means for automatically determining, in the network device, a first latency value for the first network path in the data network based on information in the first message packet;
   means for automatically determining, in the network device, a second latency value for the second network path in the data network based on information in the second message packet;
   means for selecting, in the network device, a first particular network path from between the first and second network paths based upon the first particular network path having a lowest latency value of the first latency value and the second latency value;
   means for communicating, from the network device, first data packets having a first priority level over the first particular network path in response to selecting the first particular network path;
   means for selecting, in the network device, a second particular network path from between the first and second network paths based upon the second particular network path having a lowest cost between costs associated with the first and second network paths; and
   means for communicating, from the network device, second data packets having a second priority level over the second particular network path in response to selecting the second particular network path, wherein the second priority level is lower than the first priority level.

8. The system of claim 7, wherein the at least one network device, in automatically determining a latency value, is further operative to:
   determine a first time stamp corresponding to when the first message packet was sent over the first network path;
   determine a second time stamp corresponding to when the first message packet was received over the first network path;
   calculate the difference between the first time stamp and the second time stamp to determine the first latency value for the first network path; and
   populate a routing table with the first latency value for the selected network path.

9. The system of claim 8, wherein the at least one network device is further operative to communicate the first latency values over each of the plurality of network paths.

10. The system of claim 7, wherein the first data packet comprises voice over internet protocol data.

11. A non-transitory computer-readable medium having computer-executable instructions stored thereon which, when executed by a computer, will cause the computer to perform a method for optimizing communication of data packets in a data network, the method comprising:
   receiving, in a network device, a first hello packet over a first network path in a plurality of network paths in the data network;
   receiving, in the network device, a second hello packet over a second network path in the plurality of network paths in the data network;

automatically determining, in the network device, a first latency value for the first network path in the data network based on information in the first hello packet;

automatically determining, in the network device, a second latency value for the second network path in the data network based on information in the second hello packet;

selecting, in the network device, a first particular network path from between the first and second network paths based upon the first particular network path having a lowest latency value of the first latency value and the second latency value;

communicating first data packets having a first priority level over the first particular network path in response to selecting the first particular network path;

selecting, in the network device, a second particular network path from between the first and second network paths based on the second particular network path having a lowest cost between costs associated with the first and second network paths; and communicating, from the network device, second data packets having a second priority level over the second particular network path in response to selecting the second particular network path, wherein the second priority level is lower than the first priority level.

12. The non-transitory computer-readable medium of claim 11, wherein automatically determining a latency value comprises:

determining a first time period corresponding to when the first hello packet was sent over the first network path;

determining a second time period corresponding to when the first hello packet was received over the first network path;

calculating the difference between the first time period and the second time period to determine the first latency value for the first network path; and populating a routing table with the first latency value for the selected network path.

13. The non-transitory computer-readable medium of claim 12, wherein determining a first time period comprises retrieving a time stamp from the first hello packet indicating when the first hello packet was sent over the first network path.

14. The non-transitory computer-readable medium of claim 12, wherein determining a second time period comprises retrieving a time stamp from the first hello packet indicating when the first hello packet was received over the first network path.

15. The non-transitory computer-readable medium of claim 12 further comprising communicating the first latency values over each of the plurality of network paths.

16. The non-transitory computer-readable medium of claim 12, wherein the first data packets comprise data packets containing voice over internet protocol data.

* * * * *